(12) United States Patent
Schmitt et al.

(10) Patent No.: US 8,684,725 B2
(45) Date of Patent: Apr. 1, 2014

(54) APPARATUS AND METHOD OF PRODUCING OVAL PLASTICS MATERIAL CONTAINERS

(75) Inventors: Robert Schmitt, Schierling (DE); Klaus Voth, Obertraubling (DE); Gerald Huettner, Vilseck (DE); Michael Foerster, Handewitt (DE); Lothar Martinsen, Wobbenbuell (DE)

(73) Assignee: Krones AG (DE)

( * ) Notice: Subject to any disclaimer, the term of this patent is extended or adjusted under 35 U.S.C. 154(b) by 97 days.

(21) Appl. No.: 13/227,216

(22) Filed: Sep. 7, 2011

(65) Prior Publication Data

US 2012/0080817 A1 Apr. 5, 2012

(30) Foreign Application Priority Data

Sep. 9, 2010 (DE) .................. 10 2010 044 833

(51) Int. Cl.
*B29C 49/68* (2006.01)
(52) U.S. Cl.
USPC ............ 425/526; 425/522; 425/528; 425/534
(58) Field of Classification Search
USPC ................... 425/526, 522, 528, 534
See application file for complete search history.

(56) References Cited

U.S. PATENT DOCUMENTS

| 4,174,934 | A | * | 11/1979 | Valyi | 425/112 |
| 4,233,019 | A | * | 11/1980 | Sawa et al. | 425/305.1 |
| 4,351,631 | A | | 9/1982 | Gessner et al. | 425/533 |
| 4,380,526 | A | | 4/1983 | Agrawal | 264/537 |
| 5,419,866 | A | * | 5/1995 | Valyi | 264/521 |
| 5,869,110 | A | * | 2/1999 | Ogihara | 425/526 |
| 5,968,560 | A | * | 10/1999 | Briere et al. | 425/192 R |
| 6,019,591 | A | * | 2/2000 | Valyi | 425/534 |
| 6,769,895 | B2 | * | 8/2004 | Derouault et al. | 425/145 |
| 2010/0289178 | A1 | | 11/2010 | Stoiber et al. | 264/235 |

FOREIGN PATENT DOCUMENTS

| DE | 695 18 223 | 3/2001 | ............. B29C 49/28 |
| DE | 10 2009 021 792 | 11/2010 | ............. B29C 49/64 |
| EP | 2 253 452 | 5/2009 | ............. B29C 49/78 |
| JP | 63-207630 | 8/1988 | ............. B29C 49/64 |
| JP | 4-65217 | 3/1992 | ............. B29C 49/06 |
| JP | 8-174552 | 7/1996 | ............. B29C 49/06 |
| JP | 2005212403 A | * | 8/2005 |

* cited by examiner

*Primary Examiner* — Joseph S Del Sole
*Assistant Examiner* — Lawrence D Hohenbrink, Jr.
(74) *Attorney, Agent, or Firm* — Hayes Soloway P.C.

(57) ABSTRACT

An apparatus for tempering plastics material pre-forms with a tempering mould for tempering an outer wall of the plastics material pre-forms, wherein the tempering mould has at least one first mould part which is movable and wherein the first mould part contacts a first wall portion of the plastics material pre-form at least for a time, in order to temper this wall portion. The apparatus has a supply unit in order to supply the plastics material pre-forms to the tempering mould, and this supply unit has a holding device for holding the plastics material pre-forms as well as a movement device which, in order to supply the plastics material pre-forms into the tempering mould, produces a relative movement between the plastics material pre-form and at least one portion of at least one mould part in a longitudinal direction (L) of the plastics material pre-form.

17 Claims, 5 Drawing Sheets

APPARATUS AND METHOD OF PRODUCING OVAL PLASTICS MATERIAL CONTAINERS

FIELD OF THE INVENTION

The present invention relates to an apparatus and a method of producing plastics material containers. The current methods have long been known from the prior art. In this case plastics material pre-forms for example of PET, which usually have circular cross-sections, are first heated and are then expanded inside a blow mould to form plastics material containers. In the course of this expansion procedure these plastics material containers are acted upon with compressed air in order to be expanded against the inner wall of the blow mould in this way.

BACKGROUND OF THE INVENTION

To some extent, however, there is a demand in the market for plastics material containers which do not have a circular cross-section but a cross-section diverging from this, such as for example an oval basic shape. In addition, a multiplicity of methods are known from the prior art for producing plastics material containers of this type. In this way, it is known for example for specific areas of the outer wall of the plastics material pre-forms to be heated more intensely so that they stretch to a greater degree during the subsequent stretch blow moulding procedure, so that a bottle shape diverging from a circular cross-section is formed as a whole.

This procedure is also referred to as "preferential heating" in the prior art.

A blow moulding apparatus is known from JP 08174552 A.

In this case thermally insulating reinforcing materials are used, so that the shape as a whole has a double structure. In addition, heating devices and water perforations for cooling water are provided. A possibility of controlling a thickness in a peripheral direction of a bottle is likewise described in JP 63207630 A. In this case an elliptical blow mould is likewise provided here.

The apparatus and a method of producing non-cylindrical articles from pre-forms of PET are known from U.S. Pat. No. 4,380,526. In this case blow moulds are used which themselves have an elliptical cross-section. The surface of the blow mould against which the thermoplastic material is forced can have effects upon the shaping. To this end it is proposed to apply a thermally insulating material in the region which forms the container. In this case this Teflon material is intended to improve the coefficient of friction with the plastics material of the plastics material pre-form and to reduce the transmission of heat from the material of the pre-form to the blow mould.

In the German Patent Application DE 10 2009 021 792.4—not yet published—of the Applicants a method has been described in which the plastics material pre-forms are touched in part by means of a contact element and are tempered in this way. The contents of the disclosure of this application are hereby also made the subject matter of the present application by reference in its entirety.

SUMMARY Of THE INVENTION

The object of the present invention is to make available an apparatus and a method which will permit the production of oval containers or will make it easier respectively.

This is achieved according to the invention by an apparatus for tempering plastics material pre-forms which has a tempering mould for tempering an outer wall of the plastics material pre-forms, these tempering moulds having a first mould part which is movable, and the first mould part contacting a first wall portion of the plastics material pre-form at least for a time, in order to temper this wall portion.

According to the invention the apparatus has a supply unit in order to supply the plastics material pre-forms to the tempering mould, and this supply unit has in turn a holding device for holding the plastics material pre-forms, as well as a movement device which, in order to supply the plastics material pre-forms into the tempering mould, produces a relative movement between the plastics material pre-form and at least one portion of at least one mould part in a longitudinal direction of the plastics material pre-form.

A tempering of the outer wall is to be understood, in particular, as being that previously heated plastics material pre-forms are cooled in preferred regions as compared with the heating temperature. It would also be possible, however, for specific regions of the plastics material pre-form to be additionally heated, so that these regions undergo a higher degree of extension during the stretching. In this case a tempering mould is to be understood as being a mould into which is preferably inserted the plastics material pre-form with a preset area, for example a base member which is situated below a thread or a support ring of the plastics material pre-form. In particular, however, the wall temperature of the plastics material pre-form in the contacted region is altered by the contact of this plastics material pre-form.

A relative movement between the plastics material pre-forms is to be understood as being that a suitable movement takes place in order to supply either the plastics material pre-form itself or at least one of the two mould parts, in which case it is also possible for both the plastics material pre-form and the at least one mould part to be moved. A movement in the longitudinal direction of the plastics material pre-form is to be understood as being that at least one movement component of a portion of the mould part moves in the longitudinal direction.

In this way, it is possible for example for the plastics material pre-form itself to be moved in the longitudinal direction or obliquely to the longitudinal direction, but it would also be possible for the tempering mould or the mould parts to be moved in the aforesaid longitudinal direction. In addition, it would be possible for the mould parts to be pivoted about an axis, in such a way that at least portions of the mould parts also undergo movement components in the longitudinal direction of the plastics material pre-form.

The longitudinal direction of the plastics material pre-form is, in particular, a longitudinal axis which in particular also forms an axis of symmetry of the plastics material pre-form. In the case of a further advantageous embodiment the tempering mould has at least one duct for conveying a flowable tempering medium. This flowable tempering medium can be oil or water for example. On account of the guidance of this tempering medium the tempering mould or the mould parts thereof can be kept at a pre-determined temperature which is used for tempering the outer wall of the plastics material pre-forms.

It is advantageous for the movement device to move either the plastics material pre-form or at least one mould part, in order to supply the plastics material pre-form to the tempering mould. It is advantageous for the movement device also to move either the plastics material pre-form or at least one mould part, in order to remove the tempered plastics material pre-form from the tempering mould.

It is preferable for at least one mould part to move jointly with the plastics material pre-form at least locally, or for the aforesaid mould part to move at least locally along the conveying path on which the plastics material pre-form is also moved. In this way, it is particularly advantageous for at least one mould part to be arranged in a non-stationary manner along the conveying path of the plastics material pre-forms.

It is advantageous for the apparatus to have a second mould part, and in a particularly preferred manner this second mould part is movable relative to the first mould part. It is particularly advantageous for the second mould part to contact a second wall portion of the plastics material pre-form for a time in order to temper this second wall portion. In this case this second wall portion preferably differs from the first wall portion contacted by the first mould part. In the case of this arrangement, therefore, the two mould parts co-operate in a particularly preferred manner in order to temper the plastics material pre-forms. It would also be possible, however, for more than two mould parts to be provided.

In addition, it would be possible for the apparatus to have a holding device which holds the plastics material pre-form and for only one mould part to be provided which contacts the aforesaid region of the outer wall of the plastics material pre-form in order to temper the latter.

It is advantageous for the at least one mould part to be a mould part which contacts a region of the lateral wall of the plastics material pre-form. As an alternative or in addition, however, it would also be possible for a mould part to be provided which contacts a base region of the plastics material pre-form in order to apply a temperature profile to this base region. In this case a mould part of this type which contacts the base region of the plastics material pre-form could co-operate for example with a holding device which holds the plastics material pre-form.

It is advantageous for the mould part to be movable jointly with the plastics material pre-forms at least locally, i.e. in particular along a movement path of the plastics material pre-forms. It is preferable, however, for the at least one mould part also to be movable relative to the plastics material pre-form. In this case the tempering mould can completely surround the plastics material pre-forms in the peripheral direction thereof, but this is not absolutely necessary. It would also be possible for the tempering mould to surround only some region of the plastics material pre-form, such as for example a base region or a wall portion (optionally also only in part) in the peripheral direction.

In the case of a further advantageous arrangement the mould parts surround the plastics material pre-form in a tempering state at a peripheral angle which is between 10° and 300°, preferably between 10° and 240°, with respect to the longitudinal direction of the plastics material pre-form as a whole. In this way it is possible for large areas in the peripheral direction of the plastics material pre-form to be tempered, but it would also be possible for only small areas to be tempered, in which case it would also be possible for a plurality of such areas to be present uniformly distributed for example in the peripheral direction. It is advantageous for a tempering of the plastics material pre-form to take place along its entire length below the thread or support ring respectively.

In the case of a further advantageous embodiment the apparatus has a rotation device which rotates the plastics material pre-form about its longitudinal axis. In the prior art containers of this type are also known which not only have an oval cross-section but, in addition, also have a closure which is made correspondingly oval. This closure has to be arranged at a precise angle with respect to the container in a closed state of the container. It is therefore proposed that the rotary setting of the plastics material pre-form should be preset in a precise manner, in order also to apply a non-circular closure in a defined setting in this way.

In this case it is advantageous for the plastics material pre-form to be rotated about a defined angle before the tempering, in which case a setting of the thread of the plastics material pre-form can first be detected with a detection device. It is advantageous for the rotation device to have a servo motor or a stepping motor in order to fix precise rotational settings of the plastics material pre-form.

It is advantageous for the holding device to be an inner or outer gripping means which in a particularly preferred manner grips the pre-form in the neck region from the inside or the outside or on a region of its body, it being preferably possible for this region to be tempered at the same time by the gripping.

In the case of a further advantageous embodiment the holding device has a mandrel which is capable of being introduced into an opening of the plastics material pre-forms. In this case this mandrel can hold the plastics material pre-form in a particularly advantageous manner, without the tempering procedure being obstructed during this.

It is advantageous for the first mould part and the second mould part to be movable in a straight direction with respect to each other. In this case it is advantageous for this direction to be substantially at a right angle to the longitudinal direction of the plastics material pre-form. This means that the two mould parts or tempering moulds respectively are closed around the plastics material pre-forms.

In the case of a further advantageous embodiment at least one mould part is pivotable about a pre-set pivot axis. In this way, as mentioned above, a partial movement in the longitudinal direction of the plastics material pre-form is also produced. In this case the direction of the pivot axis is advantageously at a right angle to the longitudinal direction of the plastics material pre-form and is preferably offset with respect to it.

In order to temper the mould parts there are a number of possibilities. In this way, it would be possible for ducts for a flowable, and in particular a liquid, tempering medium to be provided in the interior of the mould parts. It would also be possible, however, for the tempering to take place electrically. In this way, for example, it would be possible for Peltier elements to be provided, which would cool the mould parts or at least the wall portions which come into contact with the containers. In addition, heating of the aforesaid wall portions would be possible.

It would also be possible for the mould parts themselves to have still pre-set contours. In this way, it would be possible for a first portion of a mould part which comes into contact with the plastics material pre-form to be heated differently from another portion which comes into contact with the plastics material pre-form. In this case these sub-portions of the mould parts can also have different sizes and/or different temperatures in working operation. In this way, for example, improved areas or webs can be formed in the container walls.

In the case of a further advantageous embodiment the movement device moves a plastics material pre-form in its longitudinal direction and in this way brings it between the two mould parts.

In the case of a further advantageous embodiment the apparatus has a conveying device for conveying the plastics material pre-forms along a pre-set conveying path. It is advantageous for the tempering of the plastics material pre-forms to be carried out during this conveying. In the case of a further advantageous embodiment the apparatus has a plurality of the aforesaid tempering moulds. It is also advantageous for these tempering moulds to be conveyed along the aforesaid conveying path. In this case it is possible for a holding device for the plastics material pre-forms and the tempering mould to be arranged on a common support. This support can advantageously be a rotatable support.

In addition, the present invention relates to a plant for shaping plastics material pre-forms to form plastics material containers. In this case this plant has a heating device, which heats the plastics material pre-forms, and a shaping device, arranged downstream of this heating device in a conveying direction of the plastics material pre-forms, in order to shape the plastics material pre-forms to form plastics material containers.

According to the invention at least one apparatus for tempering plastics material pre-forms of the type defined above is arranged in the conveying direction of the plastics material containers between the heating device and the shaping device. This means that first of all a heating of the plastics material pre-forms is carried out, and then a partial tempering and finally the actual shaping procedure by means of a blow mould. In this case, however, the blow mould and the aforesaid tempering mould are, as mentioned, parts of the plant arranged one behind the other.

In the case of a further advantageous embodiment a bypass is provided, by means of which it is possible to bypass the apparatus mentioned above for tempering the plastics material pre-forms. Many manufacturers of beverage containers would also want to produce round containers in addition to the non-rotationally symmetrical containers mentioned in the introduction. In order to produce round containers of this type, the apparatus mentioned above is not necessary and is therefore preferably by-passed.

It would also be possible, however, for containers of this type not to be conveyed through a by-pass but rather through the apparatus described above, but not, however, to be treated by the latter. In this case it is advantageous for a control device to be provided which has the effect that the holding devices with the plastics material pre-form arranged on them do not extend as far as the contacting elements but for example remain above them. In addition, it would be possible for the contacting elements or the mould parts respectively not to be fed to the plastics material pre-forms in a working operation of this type in which round containers are intended to be produced.

To this end it is possible for a control cam used for this feed to be removed or deactivated. If motor drives are provided for the feed, they can likewise be actuated in such a way that no feed takes place. In this way it would be possible for the mould parts not to move (in particular towards the plastics material pre-forms). A non-feed of this type can be relevant in particular in those cases in which no axial movements of the plastics material pre-forms are carried out, as is explained in greater detail below with reference to the figures.

It is advantageous for the apparatus for tempering plastics material pre-forms to be capable of being controlled in such a way that pre-set plastics material pre-forms or groups of plastics material pre-forms are not tempered and, in particular, are not contacted by the mould parts.

It is therefore advantageous for the contacting of the plastics material pre-forms by the mould parts to be capable of being controlled or for the apparatus to be capable of being controlled respectively in such a way that the tempering of the plastics material pre-forms can be switched on or switched off.

In the case of a further advantageous embodiment the apparatus has a rotation prevention element which prevents rotation of the plastics material pre-form with respect to its holding device. In this way, for example, the support rings of the plastics material pre-forms could have a recess into which a corresponding pin of the holding devices engages.

The present invention additionally relates to a method of tempering plastics material pre-forms, in which the plastics material pre-forms are heated by means of a heating device and pre-set areas of the outer wall of the plastics material pre-forms are then tempered by means of an apparatus for tempering the plastics material pre-forms in such a way that a temperature profile which changes in a peripheral direction of the plastics material pre-forms is formed on the outer wall of the plastics material pre-forms.

According to the invention the plastics material pre-forms for tempering are introduced into a tempering mould, and this tempering mould has at least one movable mould part, and in order to introduce the plastics material pre-forms a relative movement between the plastics material pre-form and at least one mould part is provided in a longitudinal direction of the plastics material pre-form. As mentioned above, it is possible in this case for the tempering mould to be moved or even for the plastics material pre-form itself to be moved. It is advantageous for the tempering mould to be tempered by means of a tempering medium. In the case of a further advantageous method the pre-form is then shaped and, in particular, shaped in a blowing station.

In the case of an advantageous method at least individual plastics material pre-forms or groups of plastics material pre-forms are not tempered. In this way it is possible, within the limits of a plant for the treatment of plastics material containers, for containers of this type with a substantially round cross-section (which are not (pre-)tempered in the above manner) also to be produced.

BRIEF DESCRIPTION OF THE DRAWINGS

Further advantages and embodiments may be seen in the accompanying drawings. In the drawings

DETAILED DESCRIPTION OF THE INVENTION

Figure 1:
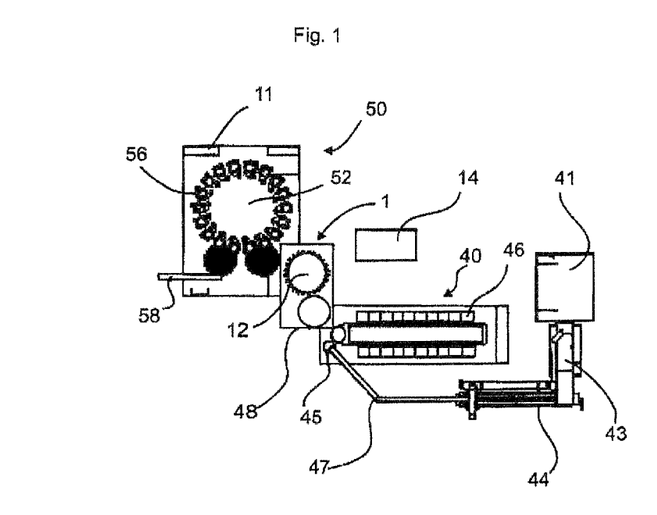
FIG. 1 is a diagrammatic illustration of a plant for the treatment of containers.

FIG. 1 is a diagrammatic illustration of a plant for the treatment of containers. In this case a reservoir 41 for plastics material pre-forms 10 is provided, as well as a conveyor means 43, such as for example an inclined conveyor, adjoining this reservoir 41. This conveying means is adjoined by a roller-type sorting means 44 and the latter is in turn adjoined by a conveyor rail 47 for conveying the plastics material pre-forms 10. The plastics material pre-forms 10 are supplied by way of a singled-ended wheel 45 to a heating device designated 40 in its entirety.

This heating device 40 has in this case a plurality of heating elements or heating cavities 46 in which the plastics material pre-forms 10 are heated. In this case it is advantageous for the plastics material pre-forms 10 to be heated in a uniform manner in the aforesaid heating device 40, i.e. possibly apart from their opening area they are acted upon with a uniform temperature profile. A transfer wheel 48, which transfers the plastics material pre-forms 10 to the apparatus 1 according to the invention for tempering the plastics material pre-forms 10, is attached to the heating device 40.

In this case this apparatus 1 has a plurality of tempering moulds 4, these tempering moulds having mould parts 4a, 4b or impression plates respectively which contact the areas of the plastics material pre-forms 10. In this way, the apparatus 1 according to the invention is arranged between a blow moulding machine 50 and the heating device 40 which in this case is designed in the form of an infrared oven. Alternatively, however, the heating device 40 can also be provided inter alia in the form of a microwave oven or STIR or laser heating means respectively. In addition, a multiplicity of heating devices (also of different types), in particular following in succession, can also be provided.

The reference number 14 relates to a tempering appliance which heats the mould parts 4a, 4b or support plates of the individual tempering moulds 4 to the desired processing temperature. As mentioned above, a blow moulding machine 50 is attached to the apparatus 1 according to the invention, this blow moulding machine having a rotatable blowing wheel 52 with a plurality of blowing stations 56 which are arranged on it and inside which the plastics material pre-forms 10 are expanded to form plastics material containers by being acted upon with pressure. The reference number 11 relates to control devices for controlling the shaping process. The plastics material containers which are now shaped are removed from the machine by way of a removal means 58.

Figure 2:
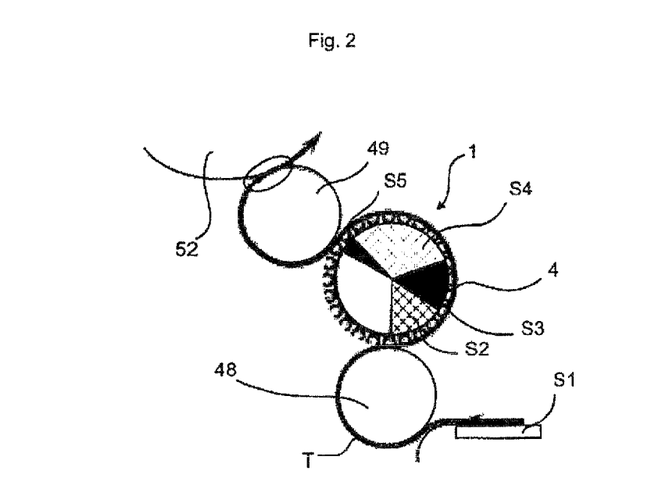
FIG. 2 is a detailed illustration of the plant shown in FIG. 1.

FIG. 2 is a detailed illustration of the apparatus shown in FIG. 1, in particular the process sequence during the tempering of the plastics material pre-forms 10. Here too the plastics material pre-forms 10 are supplied to the apparatus 1 according to the invention along the line T.

In this case the plastics material pre-forms 10 are fed to different treatment parts S1 to S5. In part S1 which is still present in the heating device 40, the plastics material pre-forms 10 are heated in a uniform manner, as known from the prior art. After that, they are taken over on a part S2 from the transfer wheel 48 and are orientated in a further step S3. In this case this orientation is carried out by a rotation of the plastics material pre-forms 10 about the longitudinal axis thereof, in order to achieve a desired thread setting.

In part S4 the plastics material pre-forms 10 are tempered in a selective manner, i.e. specified areas of the outer wall of the plastics material pre-forms 10 are tempered. The conveying star wheel 48 can also be a distribution delay star wheel which alters a distribution between the individual plastics material pre-forms 10, for example enlarges it, and which then supplies the containers to the apparatus 1. The orientation in part S3 is carried out for example before and/or during the dipping of the plastics material pre-forms into the respective tempering moulds. In part S4, as mentioned, a temperature profile is impressed by means of the impression plates on the radius. The time duration of this treatment is advantageously capable of being changed, in which case changes can be carried out for example by the mould parts closing around the plastics material pre-forms 10 earlier or later.

In part S5 an equalization time is made possible for the plastics material pre-forms 10. In addition, the plastics material pre-forms 10 are in turn orientated by rotation in such a way that they can be transferred in a correct rotational setting to the blowing wheel 52 or the individual blowing stations respectively. The reference number 49 designates a further distribution delay star wheel, with the aid of which the plastics material pre-forms 10 are transferred to the blowing wheel 52. The plastics material pre-forms 10 are blow moulded in the correct orientation with respect to the blow mould (not shown) in a conventional blow moulding process to form plastics material containers. In addition, the length of this equalization time is advantageously capable of being changed, and this can be carried out for example by an earlier or later removal of the plastics material pre-form 10 from the tempering mould 4.

Figure 3:
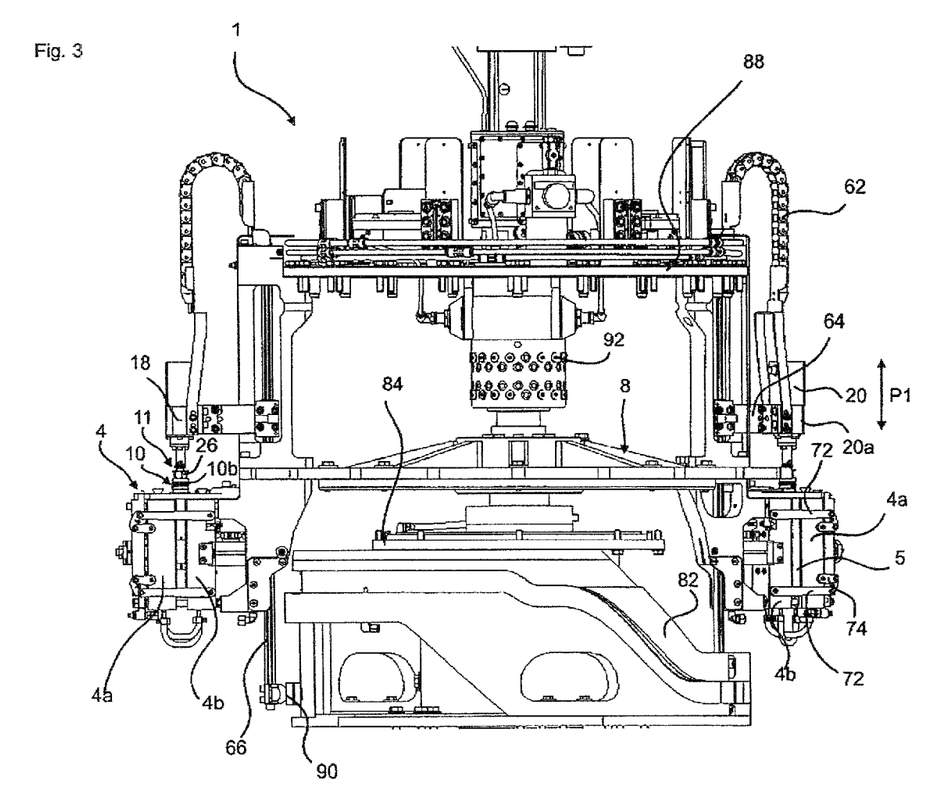
FIG. 3 is an illustration of an apparatus according to the invention.

FIG. 3 is an illustration of an apparatus 1 according to the invention. In this case this apparatus has a support wheel 8 on which a plurality of tempering moulds 4 are arranged and are moved by this support wheel 8. A pre-form inspection means is arranged between the distribution delay star wheel 48 shown in FIG. 2 and the apparatus 1 according to the invention or the treatment star wheel 8 respectively in order to detect opening markings for the orientation of the openings or the plastics material pre-forms respectively. In general, the pre-form inspection means could be provided between the heating device 40 and the device according to the invention. As well or in addition, it would also be possible for an orientation of the plastics material pre-forms to be carried out by the rotation thereof on a blowing wheel.

The reference number 20 relates to a movement device which is also used in order to orientate plastics material pre-forms with respect to their rotational position. In this case this movement device 20 is arranged in a movable manner on a spline shaft 66 by way of a slide 64. The reference number 88 designates a console wheel on which the aforesaid spline shaft is likewise arranged. Electrical supply lines for the movement device 20 are conveyed by way of a guide 62. The individual tempering moulds 4 are thus set on the support or the treatment star wheel 8 and are additionally fixed and orientated from above by means of the console wheel 88 mentioned. The support wheel 8 is in turn arranged on a star column 84 on which a stroke cam 82 is also arranged. The tempering medium is conveyed into a rotary distributor 92 through a hollow-bored shaft 15 by a rotary distributor. Forward-flow and return-flow connections, from which hoses (not shown) lead to the rear mould part 4b and the mould part 4b situated on the inside in each case respectively, are mounted in this rotary distributor.

The movement device 20 is movable in its entirety and it performs an upward and downward movement in the direction of the double arrow P1. This in turn is made possible on account of the fact that the spline shaft 66 has mounted on it a roller 90 which runs in the stroke cam 82. In this way, the plastics material pre-form 10 can be received and can dip into the tempering mould 4 or into the processing chamber respectively. In addition, it is possible to prevent the rotation of the unit by using the spline shaft 66. In addition, a friction clutch can be incorporated in the motor support 64.

Figure 4:
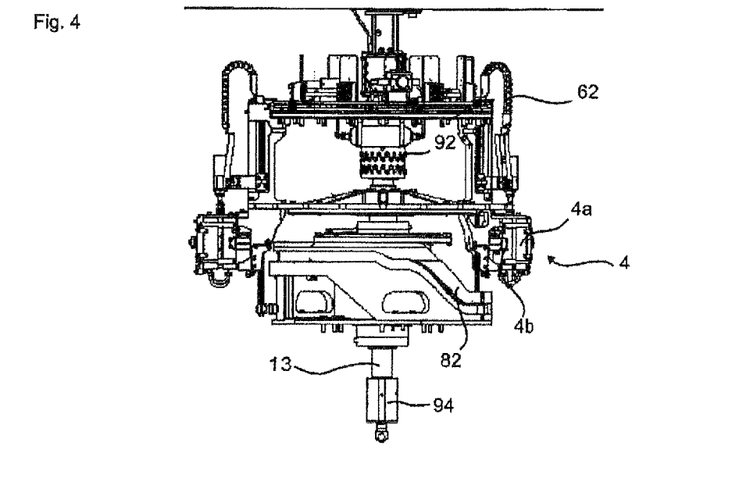
FIG. 4 is a further illustration of an apparatus according to the invention.

FIG. 4 is a further illustration of the apparatus shown in FIG. 3. In this case, in particular, a further rotary distributor 94 is evident, which supplies the tempering medium by way of the hollow shaft 13 to the rotary distributor 92 shown in FIG. 3.

Figure 5:
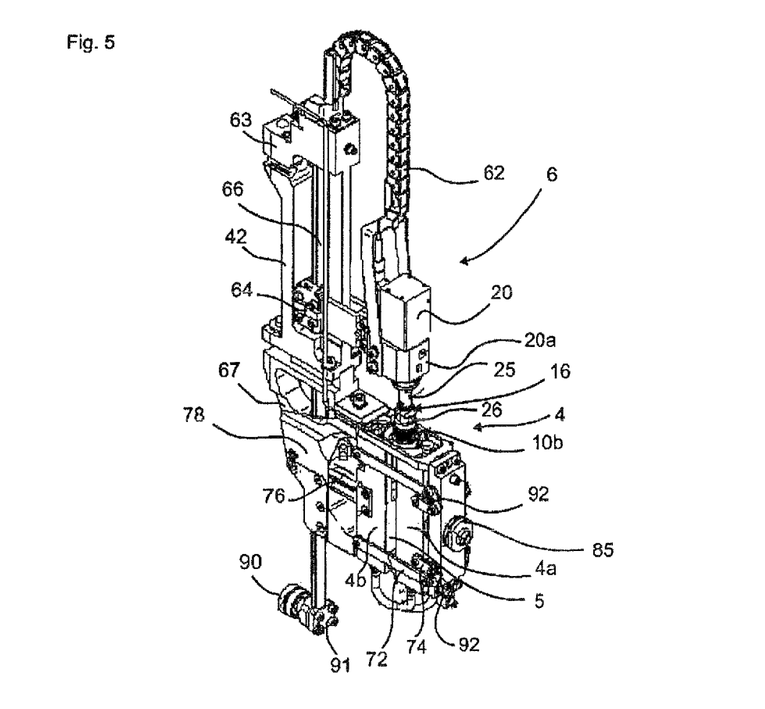
FIG. 5 is a detailed illustration of the apparatus shown in FIG. 4.

FIG. 5 is an illustration of an individual treatment station. In this case the spline shaft 66 is in turn illustrated with the cam roller 90 associated with it. The reference number 78 designates a lower guide for the aforesaid cam roller 90 and the reference number 91 a lower guide for the spline shaft.

Here too, the reference number 64 designates the motor support for holding the movement device 20 or the stepping motor unit 20a respectively. The reference number 42 accordingly designates an upper holding means and the reference number 63 an upper guide for the spline shaft 66. The reference number 67 designates a lower holding device.

In this case the tempering mould 4 has two mould parts 4a and 4b which are movable towards each other here. The reference number 76 designates a drive device, such as a linear motor, which is used for moving the two mould parts 4a and 4b up to each other. For this purpose the apparatus has a push rod 72 as well as a thrust rod 74 which are connected to each other by way of a deflecting means 92 which in this case is made articulated or pivotable. On account of this mechanical system, during a movement of the inner mould part 4b towards the outside, the outer mould part 4a is also pulled towards the inside at the same time and the cavity is closed around the plastics material pre-form 10 in this way. A receiving space 5 for tempering the plastics material pre-forms 10 is formed between these two mould parts 4a, 4b.

The reference number 25 designates a mandrel receiving means and the reference number 26 a gripping means for the plastics material pre-form, which engages in an opening 10b of the plastics material pre-form. The reference number 6 designates a supply unit which supplies the plastics material pre-forms 10 to the tempering unit 4. In this case the plastics material pre-forms are supplied in their longitudinal direction here. The reference number 16 designates a holding device for holding the plastics material pre-forms.

The processing chamber, which is formed by the two mould parts 4a and 4b, is tempered and is provided with a temperature sensor for regulating the nominal temperature. The two mould parts 4a and 4b, which are designed with a special inner contour which is dependent upon the bottle or the plastics material pre-form, are arranged in this processing chamber. The mould parts 4a, 4b are designed for the respective bottle contour and geometry of the plastics material pre-forms and can be replaced when the type is changed.

The impression plates or mould parts 4a, 4b can preferably consist of two different materials; the first for example of a thermally insulating material (for example Teflon) and the second of a thermally conductive material (aluminium). In a particularly preferred manner webs can be attached to the impression plate in the longitudinal and/or peripheral direction in order to temper specified locations on the pre-form in a purposeful manner.

In addition, it would be possible for an impression plate to have areas which consist of a thermally conductive material in order to remove heat from a wall part of the pre-form 2, as well as areas which consist of a thermally insulating material in order to supply heat to a wall part of the pre-form 2.

The plastics material pre-form 10 is received during the transfer from the transfer wheel 48 by the gripping device 26.

The vertical positions of the gripping device 26 are left through the groove curve 82. In the example shown, the vertical positions of the upper setting amount to +23 mm, as also in the case of the heating device mounted in front (not shown, for heating the plastics material pre-forms 10). During the transfer the gripping means 26 dips into the opening 10b of the plastics material pre-form 10. When this end position is reached, the movement device 20 is at the vertical position of 0 mm. The clips of the transfer star wheel 48 can open and move away.

The plastics material pre-form 10 is rotated by the movement device 20 into the desired position so that the opening 10b is aligned in a manner orientated with respect to the bottle body of the plastics material pre-form 10. This is advantageous if, for example, the closure requires a specified setting with respect to the bottle body. In this case the orientation is carried out during the dipping into the processing chamber. It would also be possible, however, for this orientation to be carried out before the dipping or even after the dipping.

An orientation mark of the plastics material pre-form 10 is recognized with the aid of a sensor, in particular a soft sensor, and the position is conveyed to the control means of the stepping motor 20a. As an alternative, laser probes, light probes, mechanical switches or a mechanical catch could also be used for the recognition. After the end position has been reached (for example at a position of −155 mm) the plastics material pre-form 10 can be treated or tempered respectively. The orientation and the stroke movements can also be carried out by a linear/rotary drive which performs the stroke movement and the rotational movement. In this way it would be possible for the stroke cam 82 to be dispensed with completely.

The rear mould support 4b is pushed forwards by means of the drive 76 or stepping motor, as mentioned, and the force is deflected by way of the push rod 72 in the deflection onto the thrust rod 74, so that the front mould part 4a is actuated and the processing chamber closes in the direction of the centre, i.e. also the axis of symmetry of the plastics material pre-form 10. In this case the two mould parts 4a, 4b or the inner walls thereof respectively touch the plastics material pre-form 10 and the latter is tempered in this way.

The stroke during the closure of the mould parts 4a, 4b can be limited in this case by a mechanical stop 85. In the case of the variant with a stepping motor a stop is not necessary, since the closure position can be set by the number of the steps (this variant has the advantage of particular flexibility.) In this case the starting point and end point of the opening and closing are made variable and can be set for example by way of a control means.

After the treatment of the plastics material pre-form 10 the mould parts 4a, 4b are moved apart again, this being carried out by a suitable return stroke of the movement device 76 or by the stepping motor respectively. The plastics material pre-form 10 now no longer has any contact with the two mould parts 4a, 4b.

After the treatment is concluded, the equalization time starts for the plastics material pre-form 10. During this time the plastics material pre-form 10 can be orientated with respect to the blow mould, this advantageously being carried out at the latest when the stepping motor unit 20a moves upwards again. In the transfer position (the position 0 mm) the orientation is advantageously concluded at the latest.

During the transfer to the blowing wheel 52 the clip of the distribution delay star wheel 49 moves in turn into a groove in the opening of the plastics material pre-form 10 and closes. After that, the stepping motor unit 20 is moved upwards. Finally the plastics material pre-form 10 is blow moulded in the blow moulding machine 50. The first mould parts 4a are advantageously situated completely radially outside the mould parts 4b.

FIGS. 6a to 6k show, roughly diagrammatically, further concepts of the introduction of the plastics material pre-form 10 into the tempering mould 4. In the case of the variant shown in FIG. 6a the plastics material pre-form 10 and also the processing chamber or the mould parts 4a and 4b respectively move towards one another.

Figure 6:
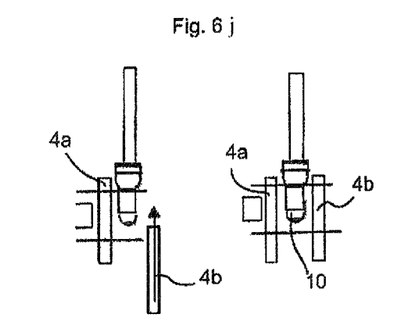
FIGS. 6a-6j show different arrangements for the introduction of the pre-form.
Figure 6A:
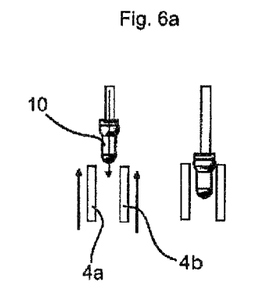
Figure 6B:
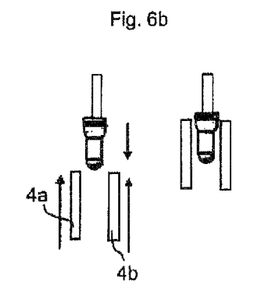
Figure 6C:
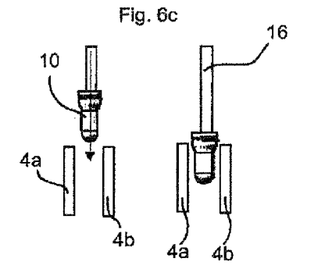

In the case of the variant shown in FIG. 6b the plastics material pre-form 10 is not moved in its longitudinal direction L but only the two mould parts 4a and 4b are moved. The variant shown in FIG. 6c represents the variant already described above, in which the plastics material pre-form 10 enters the processing chamber or between the mould parts 4a and 4b respectively.

Figure 6D:
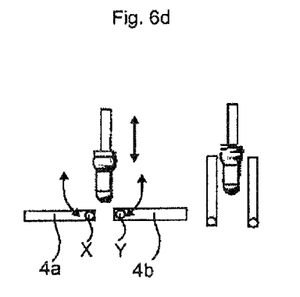

In the case of the scissor-like illustration shown in FIG. 6d, the plastics material pre-form 10 itself is not moved in its longitudinal direction L but the two mould parts 4a and 4b are pivoted (in the manner of scissors) about respective axes X, Y. In this way, however, areas of these mould parts 4a and 4b are also moved in the longitudinal direction L or have a component in the longitudinal direction L respectively.

Figure 6E:
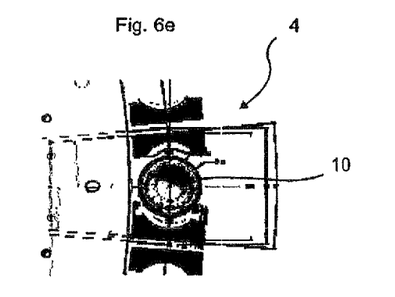

In the case of the concept shown in FIG. 6e the tempering mould is a mini mould support which likewise clamps the plastics material pre-form 10. In the case of this embodiment a movement of the plastics material pre-form 10 in its longitudinal direction is not absolutely necessary. It would be possible for the plastics material pre-form 10 to be supplied at a right angle to its longitudinal direction.

In the case of this embodiment shown in FIG. 6e it would be possible for the two mould parts 4a, 4b to be pivotable about a common axis in order to open or close the tempering mould 4 in this way. In the case of this embodiment it is advantageous for the plastics material pre-form 10 to be contacted by the mould parts 4a, 4b or the inner wall thereof respectively along its entire length situated below the thread. In addition, in the case of this embodiment it would also be possible for the two mould parts 4a and 4b or at least one of these two mould parts to move in a straight line in order to open and close the tempering mould 4. In contrast to blow moulds, only relatively small movements of the respective mould parts 4a, 4b are necessary in the case of the tempering forms 4 shown here, since no blow moulded container but only a plastics material pre-form 10 has to be removed. In addition, in the case of this embodiment and also the other embodiments it is possible for the two mould parts 4a, 4b to be designed in a mirror image with respect to each other.

Figure 6F:
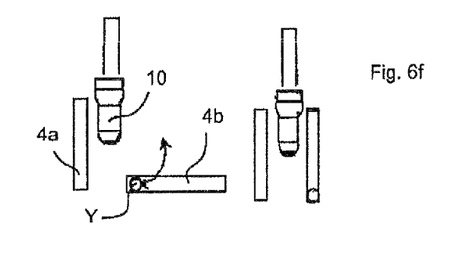

In the case of the embodiment shown in FIG. 6f only one of the two mould parts, namely the mould part 4b, is pivoted about the axis y thereof and the plastics material pre-form 10 itself is not moved in the longitudinal direction thereof. With this embodiment the mould part 4b thus also moves in the longitudinal direction L or has a movement component in this direction respectively.

Figure 6G:
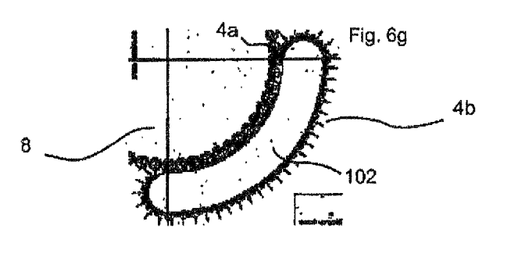

In the case of the variant shown in FIG. 6g the first mould parts 4a are guided on a support wheel 8 and the second mould parts 4b run on a kidney-shaped table 102 attached by way of the treatment space. In this way, the second mould parts 4b are jointly guided on a chain or a toothed belt, in which case the chain can also be driven by way of the support wheel 8 for synchronization purposes. With this arrangement a movement of the plastics material pre-form 10 or the mould parts 4a, 4b in the longitudinal direction L thereof is not absolutely necessary. In addition, in the case of this embodiment a specific first mould part 4a need not always be associated with a second mould part 4b in a precise manner.

In general, in the case of this embodiment the first mould parts 4a are conveyed with a first conveying device and the second mould parts 4b by means of a second conveying device, these two conveying devices being, in particular, separate from each other. It is advantageous for the mould parts 4a, 4b arranged on the two different conveying devices to be brought together in a pre-set region, in which case a plastics material pre-form 10 is also arranged between the two mould parts 4a, 4b in this region. In this way, the conveying paths of the first mould parts 4a deviate at least locally from the conveying paths of the second mould parts 4b.

It is advantageous for a conveying path, on which the first mould parts 4a are conveyed, to be parallel in a specified region to a conveying path on which the second mould parts 4b are conveyed. It is advantageous for the inner faces of the first mould parts 4a to face away from the inner faces of the second mould parts 4b at least locally. In the case of a further advantageous embodiment the conveying speed of the first mould parts 4a is equal to the conveying speed of the second mould parts 4b.

Figure 6H:
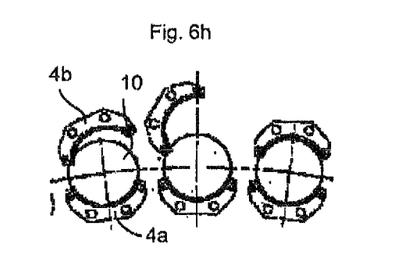

In the case of the embodiment shown in FIG. 6h a holding means capable of being pivoted out is provided, this holding means being pivoted out when the plastics material pre-forms 10 are introduced, so that the plastics material pre-forms 10 can be introduced through the gap. After the two mould parts 4a, 4b are closed, a pin or the like can be moved from the vertical plate or the "vertical" mould part 4a respectively into the movable holding means or the movable mould part 4b respectively, which on the one hand centres and on the other hand activates a parallel closing mechanism.

In the case of this embodiment shown in FIG. 6h it is possible for the respective first mould parts 4a to be arranged in a fixed manner with respect to a support, such as for example a conveying wheel, and for the second mould parts 4b to be arranged in a movable manner with respect to this conveying wheel, to which end it is particularly advantageous for the second mould parts 4b to be pivotable with respect to a pivot axis which is at a right angle to a conveying direction of the plastics material pre-forms 10 and which in a particularly preferred manner is parallel to in a longitudinal direction L of the plastics material pre-forms 10.

Figure 6I:
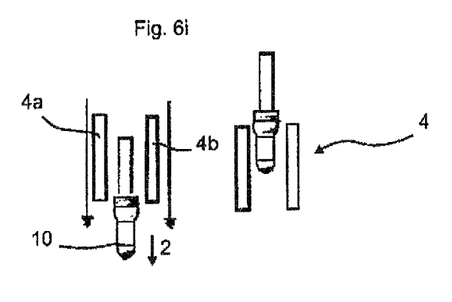

In the case of the embodiment shown in FIG. 6i the mould parts 4a, 4b arrive from above, i.e. they are moved downwards in the longitudinal direction L of the plastics material pre-form 10. If the clip of the plastics material pre-form 10 is outside the collision zone, the unit 4 can move further downwards, as shown in the right-hand part of the picture of FIG. 6i.

In the case of the situation shown in FIG. 6j it is possible for a mould part or one side 4b to move away downwards. In the upper state a piston moves into the movable side and centres it, in which case the mechanism on the two mould parts 4a, 4b can be triggered by this stroke, so that these two mould parts 4a, 4b can be moved together in a parallel manner.

In order to move the mould parts 4a, 4b a multiplicity of driving variants are possible. In this way, a plunger coil drive could be used, or even an adjustable cam, in which case for example the mould parts are open and are opened and closed by means of an adjustable stop. In addition, a two-part closure mechanism would be possible.

In general, the tempering of the impression plates or mould parts 4a, 4b respectively, the temperature of the plastics material pre-form 10 downstream of the heating module, the time and the duration of the treatment or tempering, the time and the duration of the equalization time, the surface to be treated on the plastics material pre-form 10 (area and geometry) as well as the frequency of the treatment are relevant for the process of tempering the plastics material pre-forms 10 as described here.

The temperature of the mould parts 4a, 4b or impression plates respectively is dependent upon the shape of the bottle, the wall thickness of the pre-forms and the treatment time and is advantageously between 35° C. and 110° C., advantageously between 35° C. and 85° C.

The temperature of the mould parts 4a, 4b or impression plates respectively can also be selected in a manner dependent upon the geometry of the plastics material pre-forms 10 or the containers to be produced (wall thicknesses, length/width ratio). In addition, the treatment time and the equalization time which is available can also jointly determine the temperature of the mould parts.

The temperature of the plastics material pre-forms 10 is dependent upon the resin used and upon the subsequent treatment and is generally between 95° C. and 120° C.

In the case of a preferred embodiment at least one sensor is present in order to determine the temperature. This sensor is preferably situated in the region from the beginning of the heating device 40 as far as the end of the blowing wheel 52, and in a particularly preferred manner at the end of the heating device 40, on the respective impression plates of the treatment star wheel 8 or on the blow moulds of the blowing wheel 52, in order to determine the actual temperature value of the plastics material pre-form 10 or the container respectively.

It is particularly preferred for this sensor to be connected to the temperature control means of the heating device 40 or the impression plates respectively in order to compare with nominal values the actual values determined and after that to regulate the temperature. In addition, it is preferable for a wall thickness measuring instrument to be present on the blowing wheel 52, which measures the wall thicknesses of the containers produced in order to be able to regulate the temperature profiling of the plastics material pre-forms 10 on the basis of these measurement results.

In the case of a station capacity of 2000 containers per cavity in the blow moulding machine 50 the treatment time or tempering time is advantageously between 50 and 1500 ms. A total treatment time including the equalization time is advantageously in a range of from approximately 3 to 3.5 s seconds. The time of the treatment is set in a variable manner in the intermediate module. The starting time and the end time are variable. Expressed in more precise terms, the time durations of the individual time periods shown in FIG. 2 and the respective peripheral angles can be changed.

The equalization time mentioned above is advantageously subdivided into three portions: One portion 1 begins downstream of the last heater box switched on until the treatment or tempering respectively. This portion 1 is therefore variable. The variability is achieved on the one hand with the heater box switched on and on the other hand with the start of the treatment.

A further portion 2 is situated downstream of the treatment or tempering, and it is also variable. A third portion 3 corresponds to the conveying through the distribution delay star wheel, which results in a fixed equalization time. The equalization time, however, is also dependent upon the machine capacity.

The plastics material pre-form 10 can also be treated a multiplicity of times in the distribution star wheel, which may be necessary for example if specific temperature profiles are to be impressed a multiplicity of times onto the pre-form.

After the first treatment the pre-form is rotated by means of a stepping motor into the desired setting (angle) and is touched a further time with the treatment plates.

The use of different temperature profiles is particularly advantageous when different bottles, which differ for example in size, shape, material or colour, are blow moulded in series by means of a blow moulding machine.

Figure 7:
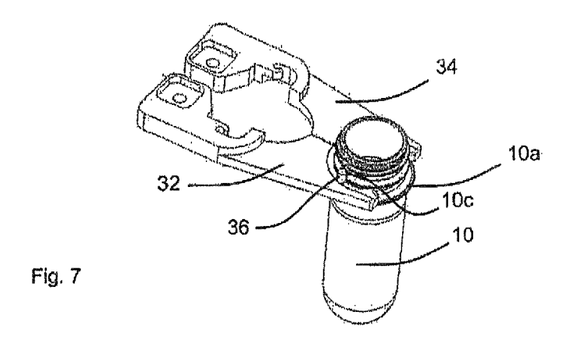
FIG. 7 shows an arrangement of a holding device for the plastics material pre-forms.

FIG. 7 shows an arrangement of a holding device 16 for holding the plastics material pre-forms 10, the holding device having in the case of this arrangement a rotation prevention means which prevents rotation of the plastics material pre-form 10 in the longitudinal direction L thereof with respect to the holding device 16. In this case this holding device has a first clip part 32 as well as a second clip part 34. These clip parts are preferably arranged so as to be movable with respect to each other, in order to grip the plastics material pre-form.

The reference number 36 relates to a projection or pin which is provided in a recess 10c which engages in the support ring 10a of the plastics material pre-form. In this way, the plastics material pre-form cannot rotate with respect to the holding device 16.

The Applicants retain the right to claim all the features disclosed in the application documents as being essential to the invention, insofar as they are novel either individually or in combination as compared with the prior art.

The invention claimed is:

1. A tempering apparatus for tempering plastics material pre-forms for use in a blow molding apparatus for forming containers having non-circular cross-sections, said tempering apparatus comprising a tempering mould located between a heating element and a blowing device of the blow molding apparatus, for tempering an outer wall of the plastics material pre-forms, wherein the tempering mould has at least one first mould part which is movable into contact with a first wall portion of the plastics material pre-form at least for a time, in order to temper this wall portion, wherein the blow molding apparatus has a supply unit for supplying the plastics material pre-forms to the tempering mould, and the supply unit has a holding device for holding the plastics material pre-forms as well as a movement device which, in order to supply the plastics material pre-forms into the tempering mould, produces a relative movement between the plastics material pre-forms and at least one portion of at least one mould part in a longitudinal direction (L) of the plastics material pre-forms, and wherein the movement device orients the preforms with respect to rotational position so that specific areas of wall portions of the preforms are heated more than other portions.

2. The tempering apparatus according to claim 1, wherein the tempering mould has at least one duct for conveying a flowable tempering medium.

3. The tempering apparatus according to claim 1, wherein the movement device moves either the plastics material pre-form or at least one mould part, in order to supply the plastics material pre-form to the tempering mould.

4. The tempering apparatus according to claim 1, wherein mould parts surround the plastics material pre-form in a tempering state at a peripheral angle which is between 10° and 300°, as a whole.

5. The tempering apparatus according to claim 1, wherein the apparatus has a rotation device which rotates the plastics material pre-form about its longitudinal axis.

6. The tempering apparatus according to claim 1, wherein the holding device has a mandrel which is capable of being introduced into an opening of the plastics material pre-forms.

7. The tempering apparatus according to claim 1, wherein the first mould part and a second mould part are movable in a straight direction with respect to each other.

8. The tempering apparatus according to claim 1, wherein at least one mould part is pivotable about a pre-set pivot axis.

9. The tempering apparatus according to claim 1, wherein the movement device moves the plastics material pre-form in its longitudinal direction.

10. The tempering apparatus according to claim 1, wherein the apparatus has a conveying device for conveying the plastics material pre-forms along a pre-set conveying path.

11. The tempering apparatus according to claim 1, wherein the tempering of the plastics material pre-forms is capable of being switched on and/or switched off.

12. A plant for shaping plastics material pre-forms to form plastics material containers having non-circular cross-sections, with a heating device which heats the plastics material pre-forms and a shaping device, arranged downstream of the heating device in a conveying direction of the plastics material pre-forms, in order to shape plastics material pre-forms to form plastics material containers having non-circular cross sections, wherein at least one apparatus for tempering plastics material pre-forms according to claim 1 is arranged in the conveying direction of the plastics material containers between the heating device and the shaping device.

13. The tempering apparatus according to claim 1, wherein mould parts surround the plastics material pre-form in a tempering state at a peripheral angle which is between 10° and 240°, as a whole.

14. The tempering apparatus according to claim 1, wherein the movement device is arranged in a movable manner on a spline shaft by way of a slide.

15. The tempering apparatus according to claim 14, wherein the spline shaft is arranged on a support wheel.

16. The tempering apparatus according to claim 15, wherein the support wheel is arranged on a star column on which a stroke cam is also arranged.

17. The tempering apparatus according to claim 16, wherein the spline shaft has mounted thereon a roller which runs in the stroke cam.

* * * * *

UNITED STATES PATENT AND TRADEMARK OFFICE
CERTIFICATE OF CORRECTION

PATENT NO. : 8,684,725 B2  Page 1 of 1
APPLICATION NO. : 13/227216
DATED : April 1, 2014
INVENTOR(S) : Schmitt et al.

It is certified that error appears in the above-identified patent and that said Letters Patent is hereby corrected as shown below:

References Cited, title page, Col. 2, line 17, add --German Search Report, Application Serial No. 10 25010 044 833.8, dated June 6, 2011 (6 pgs)-- with heading --OTHER PUBLICATIONS--.

Signed and Sealed this
Twenty-sixth Day of August, 2014

Michelle K. Lee
*Deputy Director of the United States Patent and Trademark Office*